United States Patent Office 3,331,767
Patented July 18, 1967

3,331,767
PROCESS FOR UPGRADING NAPHTHA
William Floyd Arey, Jr., and Glen Porter Hamner, Baton Rouge, and Ralph Burgess Mason, Denham Springs, La., assignors to Esso Research and Engineering Company, a corporation of Delaware
No Drawing. Filed Apr. 1, 1965, Ser. No. 444,796
35 Claims. (Cl. 208—111)

This invention relates to the selective hydrocracking of straight chain hydrocarbons with a specific catalyst composition and to the catalyst composition per se. More particularly, it relates to the upgrading of naphthas by selective hydrocracking which is accomplished with a specific form of a crystalline metallo alumino-silicate having uniform pore openings of about 5 A. and combined with a metallic hydrogenation component.

Hydrocracking with crystalline alumino-silicate zeolite catalysts is now well known in the art. The use of these zeolites for hydrocracking has been generally directed to typical petroleum derived feedstocks, such as gas oil etc., which are customarily converted to lower boiling products useful as gasoline. The crystalline zeolites employed for such purposes usually have uniform pore openings of about 6 to 15 A. and are therefore non-selective; that is, substantially all of the feed molecules are admitted into the zeolite pore structure. However, for many purposes selective hydrocracking of only certain molecular species would be desired. One such purpose, for example, is the octane improvement of naphtha fractions by selectively hydrocracking only straight chain hydrocarbons (e.g. olefins, paraffins, etc.) which tend to be low octane producing, and thereafter removing the hydrocracked products and recovering a higher octane product. The use of a non-selective large pore (e.g. 6 to 15 A.) crystalline zeolite for this purpose would be ineffectual, since desired feed molecules, e.g. aromatics, would be admitted into the zeolite pores and hydrocracked along with the straight chain hydrocarbons.

It has accordingly been discovered that highly effective selective hydrocracking of straight chain hydrocarbons can be accomplished by the use of a crystalline aluminosilicate zeolite having uniform pore openings of about 5 A. It has further been surprisingly discovered that a particular cation form of this zeolite is so substantially better than other forms, that it is the material of choice. Specifically, it has been found that the 5 A. zeolite should be zinc-containing, preferably having a major portion of its cation content supplied by zinc cation, and most preferably having been exchanged solely with zinc cation for replacement of alkali metal originally in the zeolite.

The following discussion will be directed to a preferred embodiment of this invention wherein naphtha fractions are upgraded by use of this invention. It is to be understood, however, that this invention is intended to embrace a novel catalyst composition and its general use in the selective hydrocracking of straight chain hydrocarbons, as well as the specific utility described below.

It is customary to upgrade naphtha fractions for inclusion in the high quality motor gasoline necessary for modern automobiles. Normally, this will consist of either improving the octane rating or improving the cleanliness or gum forming properties of the naphtha. Upgrading of the octane rating has been accomplished by such means as thermal or catalytic reforming, cracking, etc. The desired product is usually of about the same boiling range as the feed, with the molecules having been rearranged or reformed into higher octane-producing compounds. However, the extent of reforming or conversion of naphtha and naphtha-containing oils is usually limited by the formation of excessive coke as reaction temperature increases. For this reason, processes such as catalytic cracking and reforming and the like are usually designed to avoid excessive coke and dry gas make with, however, a corresponding limitation on the degree of naphtha improvement attainable. Upgrading of "cleanliness" or gum forming properties is also quite important with certain olefinic naphthas, especially naphthas produced in thermal cracking or coking operations. In this case, upgrading is usually accomplished by either passing the naphtha over a catalytic cracking catalyst or by hydrofining. Again the first of these alternates, i.e. catalytic cracking, results in an undesirable high gas and coke make; whereas the second, i.e. hydrofining, results in a loss of octane number.

Attempts at solving the above problems have generally involved one or more hydro techniques such as hydrocracking, hydroforming, hydrodealkylation, etc., which processes tend to form lesser amounts of coke and dry gas while at the same time resulting in improved octane product. However, indiscriminate use of hydrocracking, for example, to upgrade naphthas is often self-defeating since products boiling below the range of the feed are formed, thereby lowering the naphtha yield. Hydroforming or catalytic reforming are also not practical with certain naphtha feeds, e.g. coker naphthas, which contain appreciable sulfur, nitrogen and diolefins, again because of excessive coke make and rapid catalyst deactivation. Also, catalytic hydroforming, which depends upon aromatics formation for octane improvement, is ineffective with feeds having low cycloparaffin concentration.

It will be realized, therefore, that a conversion process which is capable of selectively converting the low-octane-producing components of the naphtha feed to lower boiling components which are readily removed, with a minimum conversion of the high octane-producing components, is to be highly desired. Removal of the low octane components would thus result in enhancement of the naphtha octane number without appreciably altering its boiling range.

It has now been found, as a preferred embodiment of the invention, that naphthas may be successfully upgraded to produce a higher octane product by contacting them at suitable conditions of temperature and pressure in the presence of hydrogen, with the aforementioned catalyst comprising a zinc-containing crystalline alumino-silicate zeolite having uniform effective pore openings of about 5 A. which is combined with a metallic hydrogenation component, such as a platinum group metal. It is fully recognized that the prior art has taught the use of crystalline alumino-silicate zeolites for cracking of various petroleum and hydrocarbon materials. For example, U.S. Patents Nos. 2,971,903 and 2,971,904 disclose various hydrocarbon conversion processes employing crystalline alumino-silicates having uniform pore openings between about 6 and 15 A. As hereinbefore mentioned, the present invention employs crystalline alumino-silicates having uniform pore openings of about 5 A. which pore size has been found to be necessary and critical to the successful selective hydrocracking herein contemplated. The prior art has also recognized the possibility of selectively converting normal paraffins by means of 5 A. molecular sieves for such purposes as dewaxing, etc. These uses derive from the ability of these crystalline zeolite materials to selectively admit certain sized molecules into their pores while rejecting others. Since these materials are now well known adsorbents and catalysts, they provide highly efficient and valuable tools for selectively converting specified constituents of a hydrocarbon feed. For example, U.S. Patent 3,039,953 discloses the selective conversion of normal paraffins with a 5 A. zeolite. Also, U.S. Patent 3,140,322 relates generally to selective catalytic conversion utilizing crystalline zeolites, and mentions dehydration, catalytic cracking, hydrogenation, etc.

The essence of the present invention, which distinguishes it from the above prior art teachings, lies in the surprising discovery that certain unique 5 A. crystalline alumino-silicates are superior catalyst components for selective hydrocracking in general and octane number improvement of naphtha feeds in particular. The zinc cation-containing 5 A. zeolite combined with a metallic hydrogenation component has a strikingly greater activity than similar catalysts based on other cationic forms of the zeolite.

The process of the invention should also be distinguished from the conventional adsorption-desorption processes which are well known in the art. The present process involves a selective hydrocracking of straight chain hydrocarbons. In the naphtha octane improvement embodiment, certain low octane-producing molecules such as straight chain hydrocarbons are selectively hydrocracked to gaseous materials such as butane and lighter fractions which are easily removed. The invention does not contemplate, therefore, a mechanical separation of diverse molecules, as accomplished by the conventional adsorption-desorption phenomenon. In the case of selective hydrocracking, converted products are not retained within the pores of the zeolite and a desorption step is unnecessary thereby making the process economically attractive.

The crystalline metallo alumino-silicate zeolites having uniform pore openings of about 5 A. contemplated for use in this invention are well known and available in synthetic or natural form. For example, a suitable starting material, referred to as "Zeolite A" in U.S. Patent 2,882,243, has a molar formula (dehydrated form) of

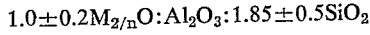

$$1.0 \pm 0.2 M_{2/n}O : Al_2O_3 : 1.85 \pm 0.5 SiO_2$$

where M is a metal usually sodium and $n$ is its valence. It may be prepared by heating a mixture containing $Na_2O$, $Al_2O_3$, $SiO_2$, and $H_2O$ (supplied by suitable source materials) at a temperature of about 100° C. for 15 minutes to 90 hours or longer. Suitable ratios of these reactants are fully described in the aforementioned patent.

One suitable process for preparing such materials synthetically involves, for example, the mixing of sodium silicate, preferably sodium metasilicate, with sodium aluminate under carefully controlled conditions. The sodium silicate employed should have a ratio of soda to silica between about 0.8 to 1 and about 2 to 1, and the sodium aluminate may have a ratio of soda to alumina in the range of from about 1 to 1 to about 3 to 1. The amounts of the sodium silicate and sodium aluminate solutions employed should be such that the ratio of silica to alumina in the final mixture ranges from about 0.8 to 1 to about 3 to 1 and preferably from about 1 to 1 to about 2 to 1. Preferably, the aluminate is added to the silicate at ambient temperature with sufficient agitation to produce a homogeneous mixture. The mixture is then heated to a temperature of from about 180° to about 215° F. and held at that temperature for a period of from about 0.5 to about 3 hours or longer. The crystals may be formed at lower temperatures but longer reaction periods will be required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The products produced by the above procedure will have uniform pore openings of about 4 A. as produced in the sodium form. They may then be converted to products having uniform pore openings of about 5 A. by replacement of the sodium via conventional ion-exchange techniques with various cations such as calcium, magnesium, cobalt, nickel, iron, manganese, zinc, etc., all of which are not suitable for purposes of this invention.

Natural zeolites having effective pore diameters of about 5 A. are also herein contemplated and will include such materials as erionite, chabazite, analcite, mordenite, lebrynite, natrolite, etc. Thus, both the natural and synthetic varieties of 5 A. zeolites are contemplated with the only limitation being one of pore size. As indicated, the pore size must be sufficient to substantially admit the straight chain hydrocarbons but insufficient to admit the valuable high octane producing components, such as the aromatics so as to avoid their hydrocracking. This capacity should, therefore, be demonstrated at the particular hydrocracking conditions contemplated, since the effective pore diameter of these zeolite materials often varies with temperature and pressure.

In accordance with the invention, it has been found that indiscriminate use of the above-mentioned cations is not suitable for the selective hydrocracking process of the invention. More particularly, it has been found that the cation utilized must specifically be a polyvalent, difficultly reducible cation. By "difficultly reducible" is meant a cation which is not reducible to a lower valence state or to the free metal by hydrogen at the hydrocracking conditions utilized. Of the above-mentioned cations, only manganese and zinc have been found suitable for purposes of the present invention, with zinc being so substantially better than manganese that it is the cation of choice. Thus, the catalyst used in the present invention is prepared from a crystalline alumino-silicate which, after zinc cation exchange, has uniform effective pore openings of about 5 A. in diameter. The most preferred cation solution will be an aqueous solution of a zinc salt such as zinc chloride, zinc acetate, etc. The extent of ion-exchange should be sufficient to reduce the alkali metal, e.g. sodium content of the zeolite to less than 10 wt. percent, and preferably less than 5 wt. percent. The ion exchange is preferably conducted to cause at least 25%, and more preferably greater than 50%, of the exchangeable cation content to be divalent by replacement with the preferred zinc cation. It will be understood that although the most preferred catalysts will be prepared by using zinc cation as the sole exchanging cation, the presence of zinc together with other exchanging cations will also be highly useful. Thus, in its broadest aspects, the present invention contemplates the use of a 5 A. zeolite containing zinc cation. Preferably the zeolite will have a major portion of its cation content supplied by zinc with perhaps minor portions of residual sodium as well as minor portions of other ions which may also have been introduced via ion exchange for various purposes.

As a further step in the preparation of the catalysts of the invention, the catalyst is combined with an active metallic hydrogenation component which may be chosen from Groups V–B, VI–B, VII–B or VIII of the Periodic Table and which is suitably exemplified by the metals cobalt, nickel, platinum, palladium, etc. The hydrogenation component may be in the form of the free metal as in the case of platinum group metals, or as the oxide or sulfide as in the case of cobalt, etc., or mixtures of such metals, oxides or sulfides. Platinum group metals (i.e. metals of the platinum and palladium series) will be preferred for purposes of the present invention, with palladium being particularly preferred. Incorporation of the hydrogenation component may be accomplished by any conventional technique such as ion-exchange followed by reduction, impregnation, etc. When palladium is employed, the zinc-exchanged alumino-silicate is preferably impregnated with an ammoniacal solution of palladium chloride sufficient to produce the desired amount of hydrogenation metal in the final product, and then dried and calcined at a temperature of 800 to 1000° F. Reduction of the metal is then accomplished either separately or in the hydrocracking reaction per se. The amount of hydrogenation component may range from about 0.1 to about 25 wt. percent based on the weight of final product. In the case of platinum group metals, e.g. palladium, the preferred amount will be in the range of about 0.1 to 6, e.g. 0.5 to 3 wt. percent, based on dry catalyst.

As an additional preferred embodiment of the present invention, it has been found that the activity and effectiveness of the catalysts used herein may be substantially improved by contact with sulfur prior to their use in the selective hydrocracking process. The catalyst is preferably sulfactivated to enhance its activity by contact either with a sulfur-containing feed or, if the feed has a low sulfur content, with hydrogen sulfide or an added sulfur compound which is readily convertible to hydrogen sulfide at the hydro conditions employed, e.g. carbon disulfide, etc. The extent of this sulfactivation treatment should be sufficient to incorporate 0.5 to 15 wt. percent sulfur into the catalyst. The beneficial effect of sulfactivation will be demonstrated in the examples to follow.

As will be fully demonstrated in the following examples, the catalyst used in the present invention has been found to be highly effective for the upgrading of naphtha feeds, although the invention is not to be so limited. Markedly improved octane number is achieved with a very low loss of naphtha yield. Additionally, the coke make produced in the process is substantially lower than that experienced in catalytic cracking.

The feedstocks contemplated for use in the present invention may be any of the typical petroleum hydrocarbon feeds, containing straight chain hydrocarbons which are desirably removed for the particular intended use of the end product. For naphtha octane improvement, the feeds contemplated include either low boiling naphtha or high boiling naphtha-containing feeds, the latter typically having a boiling range of about 250 to 450, preferably 300 to 430° F. These feeds may be exemplified by virgin naphtha fractions, heavy coker naphtha, heavy steam cracked naphtha, heavy catalytic naphtha, and the like.

Typical hydrocracking conditions which are suitable for purposes of the present invention include a temperature of 400 to 950° F., preferably 650 to 850° F., a pressure of 200 to 4000, preferably 500 to 2500 p.s.i.g.; a space velocity of 0.2 to 20, preferably 0.4 to 2 v./v./hr.; and a hydrogen rate of 1,000 to 10,000, preferably 1500 to 5000 standard cubic feet of hydrogen per barrel of feed.

The invention will be further understood by reference to the following examples which are given for illustrative purposes.

EXAMPLE 1

This example illustrates the preparation and use of the zinc form of a crystalline alumino-silicate zeolite having uniform pore openings of about 5 A. which has been combined with palladium. The zinc zeolite containing palladium was used as the catalyst for the selective hydrocracking of straight chain hydrocarbons in two naphtha feeds which are normally not responsive to octane improvement by conventional means such as reforming. The two feeds utilized were a heavy coker naphtha and a heavy catalytic naphtha characterized by the following inspections:

| Feed | Heavy Coker Naphtha | Heavy Catalytic Naphtha |
|---|---|---|
| Gravity, °API | 46.7 | 34.7 |
| Bromine No. | 50.8 | 9.5 |
| FIA Analysis: | | |
| Percent Aromatics | 18.6 | 56 |
| Percent Olefins | 30.4 | 6.7 |
| Percent Saturates | 51.0 | 37.3 |
| Wt. Percent Sulfur | 0.221 | 0.05 |
| R.V.P | 0.9 | 0.3 |
| Distillation: | | |
| I.B.P., percent at ° F | 276 | 351 |
| 5% | 296 | 359 |
| 10% | 304 | 363 |
| 20% | 313 | 367 |
| 30% | 322 | 371 |
| 40% | 331 | 375 |
| 50% | 342 | 380 |
| 60% | 353 | 384 |
| 70% | 365 | 389 |
| 80% | 379 | 398 |
| 90% | 398 | 407 |
| 95% | 414 | 416 |
| F.B.P | 434 | 437 |

A charge of 500 grams of commercial sodium "Zeolite A" having pore openings of about 4 A. in diameter and a silica to alumina mole ratio of about 2 to 1 was suspended in 2000 grams of water and a solution containing one pound of zinc chloride in 500 cc. of water was added slowly with good agitation at ambient temperature. Agitation was continued at ambient temperature for at least 4 hours. The suspension was allowed to settle, the mother liquor was removed by filtration. This procedure was performed on the wet solids two more times so that the total number of exchanges was three. After the third exchange the product was water washed by reslurrying in about 2000 cc. of water for about one hour followed by removal of the wash liquid by filtration. The wash was repeated two times and the product dried. Analysis of the product showed 0.83 wt. percent sodium, 20.8 wt. percent zinc, 38.1 wt. percent $SiO_2$, and 30.8 wt. percent $Al_2O_3$. The product was then combined with palladium by adding 133 cc. of an ammoniacal palladium chloride solution having a palladium content of 37.5 milligrams per cc. to 500 grams of product suspended in water. The final catalyst, after drying, had a palladium content of 0.89% and was pelleted and charged to a small pilot plant reactor where it was heated in a hydrogen stream at atmospheric pressure and 850° F.

The above feedstocks were contacted in the presence of hydrogen with the above catalyst in a fixed bed unit at 850° F., 500 p.s.i.g., 0.5 v./v./hr., and at an exit hydrogen rate of about 2000–3000 s.c.f./bbl. Flow conditions were maintained for about 6–7 hours per day over 6 days. The feed was interrupted and the catalyst left overnight under a flow of hydrogen prior to each day's use. Octane number improvements obtained with these heavy naphtha feeds are summarized in the following table.

TABLE I.—HEAVY NAPHTHA OCTANE IMPROVEMENT BY SELECTIVE HYDROCRACKING

| Feed | Heavy Coker Naphtha | | Heavy Catalytic Naphtha | |
|---|---|---|---|---|
| Catalyst Age, Total Hours on Feed | 13.5; 28 | | 56.5 | |
| Overall Material Balance, Wt. Percent | 97; 99 | | 100 | |
| Product Distribution: | | | | |
| $C_1$–$C_2$, wt. percent | 2.0; 2.9 | | 1.6 | |
| $C_3$, wt. percent | 9.1; 9.8 | | 4.1 | |
| $C_4$, vol. percent | 13.7; 9.2 | | 3.2 | |
| $C_5$+ vol. percent | 78.5; 80.0 | | 91.5 | |
| Octane Data, $C_5$+ Prod.: | Feed | Product | Feed | Product |
| RON+1.5 cc. TEL | 49.5 | 83.2; 84.1 | 85.6 | 97.6 |
| RON+3.0 cc. TEL | 49.8 | 86.7; 84.1 | 90.4 | 98.8 |
| MON+1.5 cc. TEL | 60.4 | 80.0; 78.8 | 76.7 | 83.8 |
| MON+3.0 cc. TEL | 67.3 | 84.6; 83.1 | 82.8 | 88.2 |

EXAMPLE 2

This example compares the upgrading ability of the selective hydrocracking process of the invention to hydrofining and catalytic cracking, the latter two using conventional catalysts, the former using the catalyst of Example 1. The heavy coker naphtha feed of Example 1 was utilized.

naphtha is further indicated by the results of an Optical Density test (MSA-OD). This test involves the determination of optical density of a treated sample and is a measure of engine cleanliness properties of the naphtha, i.e. the lower the MSA-OD value the better its engine cleanliness properties. The tests were conducted during part of the above described operations and the results are summarized below.

TABLE II.—SELECTIVE HYDROCRACKING VS. HYDROFINING AND CATALYTIC CRACKING OF HEAVY COKER NAPHTHA FEED

| Operation | Feed | Selective Hydrocracking | Hydrofining | Catalytic Cracking |
|---|---|---|---|---|
| Catalyst | | Pd-Zn Zeolite (5 A.) | Cobalt Molybdate-Alumina | Silica-Alumina |
| Temperature, °F | | 850 | 550 | 900 |
| Pressure, p.s.i.g | | 500 | 1,000 | Atm. |
| Inspections, $C_5$—430° F.: | | | | |
| Yield, vol. percent | 100 | *80 | *99 | 73.3 |
| Research O.N.+3 cc. TEL | 49.8 | 84.1 | 60.0 | 50.6 |
| Motor O.N.+3 cc. TEL | 67.3 | 83.1 | 71.3 | 77.1 |
| Nitrogen, wt. percent | 0.03 | 0.01 | 0.01 | |
| Sulfur, wt. percent | 0.22 | 0.07 | 0.02 | 0.16 |
| Feed Lost as Coke, Percent | | 0.1 | <1 | 2.3 |

*$C_5^+$ Yield.

The superior performance of selective hydrocracking with the palladium-zinc 5 A. zeolite is thus illustrated.

EXAMPLE 3

As indicated, the catalyst of the invention contains a metallic hydrogenation component in addition to zinc cation. This example illustrates the beneficial effect of a platinum group metal as the hydrogenation component.

The zinc form of a 5 A. zeolite was prepared substantially as described in Example 1. This material was divided into four portions. Three of these portions were further treated to incorporate, respectively, 0.5, 1 and 2 wt. percent palladium by contacting with sufficient amounts of ammoniacal palladium chloride solution substantially as described in Example 1. Each of the four materials, i.e. zinc form of 5 A. zeolite containing 0, 0.5, 1 and 2 wt. percent palladium, were then individually tested as catalysts in a fixed bed pilot plant unit. The tests were all made at 850° F., 1000 p.s.i.g., and 0.5 v./v./hr. with a hydrogen gas rate of 5000 s.c.f. per barrel of feed. A coker naphtha feed was used having an API gravity of 50.1°, a bromine number of 60 gms./100 gms., a sulfur content of 0.16 wt. percent, a nitrogen content of 200 p.p.m., and a leaded (3 cc.) Research Octane Number of 61. The pilot plant unit operated on a continuous, uninterrupted basis for 24 days. The liquid product from each of these operations was recovered and distilled to give a 65 to 430° F. boiling range gasoline. The superior performance obtained by incorporating a hydrogenation metal component in the catalyst is shown by the following data on average octane number of this 65 to 430° F. naphtha fraction from the total 574 hour operation.

TABLE III.—SELECTIVE HYDROCRACKING OF COKER NAPHTHA PALLADIUM ZINC 5A. ZEOLITE CATALYST
[850° F.; 0.5 v./v./hr.; 5,000 cf./b.$H_2$ rate]

| Wt. Percent Palladium | (Feed) | 0 | 0.5 | 1 | 2 |
|---|---|---|---|---|---|
| $C_5$—430° F. Average Naphtha Research Octane No. (+3 cc. TEL) | 61 | 69 | 72 | 74 | 77 |

The effectiveness of the palladium hydrogenation component in the selective hydrocracking of heavy coker naphtha is further indicated by the results of an Optical Density test (MSA-OD).

TABLE IV.—SELECTIVE HYDROCRACKING OF COKER NAPHTHA PALLADIUM ZINC 5 A. ZEOLITE CATALYST
[850° F.; 0.5 v./v./hr.; 5,000 cf./b.$H_2$ rate]

| | Data After 320 Hours on Feed | | | | |
|---|---|---|---|---|---|
| Wt. Percent Pd | (Feed) | 0 | 0.5 | 1.0 | 2.0 |
| MSA-OD | 1.2 | 0.32 | 0.16 | 0.09 | 0.05 |

The above data indicate that the engine cleanliness characteristics of naphtha improve with increased metallic hydrogenation component content in the selective hydrocracking catalyst of the invention.

As indicated by Examples 2 and 3, the zinc form of the 5 A. crystalline alumino-silicate which is combined with palladium hydrogenation component is an excellent selective hydrocracking catalyst and provides remarkable improvement in the octane number and engine cleanliness properties of naphtha feeds normally unresponsive to conventional upgrading techniques such as reforming which usually necessitate the use of low boiling naphtha feeds.

EXAMPLE 4

Two $C_5$-$C_6$ naphthas were contacted with the catalyst utilized in Example 1 which was activated by sulfur already present in the feed. The conditions employed were 0.5 v./v./hr., 850° F., 500 p.s.i.g., and 2000-3000 s.c.f./bbl. hydrogen rate. The first naphtha was derived from a South Louisiana crude and contained 6.1% aromatics; the second was derived from an Arabian crude which was pretreated with silica gel to remove aromatics. They had the following inspections:

| | Crude Oil Source | |
|---|---|---|
| | South Louisiana | Arabian |
| Gravity, °API | 73.5 | 78.5 |
| Boiling Range, ° F | 120-185 | *137-171 |
| Wt. percent n-$C_5$ | 13.4 | 11.0 |
| Wt. percent n-$C_6$ | 18.3 | 32.0 |

*95% overhead.

The results of the selective hydrocracking tests are shown in the following table:

TABLE V.—$C_5$-$C_6$ NAPHTHA OCTANE IMPROVEMENT BY SELECTIVE HYDROCRACKING

| Feed | $C_5$-$C_6$ Naphtha from South Louisiana Crude | | $C_5$-$C_6$ Naphtha from Arabian Crude | |
|---|---|---|---|---|
| Wt. percent Paraffins in feed | 70.8 | | 85.8 | |
| Wt. percent Aromatics in feed | 6.1 | | 0 | |
| Catalyst Age, Total Hours with Feed | 71 | | 106.8 | |
| Overall Material Balance, Wt. percent | 97 | | 92 | |
| | Feed | Product | Feed | Product |
| Product Distribution, Wt. percent Output Basis: | | | | |
| $C_1$-$C_2$ | | 3.3 | | 3.4 |
| $C_3$ | | 13.8 | | 20.1 |
| $C_4$ | | [1] 4.8 | | [2] 7.4 |
| $C_5$+ | 100 | [3] 78.1 | 100 | [4] 69.1 |
| Octane Data, $C_5$+ Prod.: | | | | |
| RON+0 cc. TEL | 72.0 | 87.9 | 57.2 | 77.1 |
| RON+3 cc. TEL | 90.7 | 95.0 | 83.0 | 93.4 |
| MON+0 cc. TEL | 71.6 | 81.0 | 57.3 | |
| MON+3 cc. TEL | 90.3 | | | 95.0 |

[1] 5.7 vol. percent.   [2] 8.5 vol. percent.   [3] 76.2 vol. percent.   [4] 67.9 vol. percent.

As shown by the above data, octane number improvement was achieved with the light naphtha feeds utilized, indicating selective hydrocracking of the normal paraffinic constituents of the feed with an apparently slight net increase in aromatic content.

EXAMPLE 5

This example demonstrates the superiority of the zinc modification of the catalyst of the invention over other ion exchanged modifications of the 5 A. zeolite. An Arabian $C_5$-$C_6$ naphtha which had not been dearomatized was employed as feed. It had a gravity of 85.3° API, a boiling range of 110–185° F., a normal pentane content of 24.2% and a normal hexane content 22.9%. Catalyst performance was measured by disappearance of normal paraffins and their conversion to $C_4$-gases. For these experiments the catalyst in each instance was sulfactivated in a previous operation in which the $C_5$-$C_6$ feed contained carbon disulfide in amounts ranging from 0.5 to 1%. The test results shown were obtained without added sulfur in each instance except with the nickel catalyst (no palladium), and in this exception the data are representative of operation with 1% carbon disulfide in the feed. Test conditions included: temperature 850° F., pressure 500 p.s.i.g., exit hydrogen rate 2000–3000 c.f./b., and feed rate 0.5 v./v./hr. The ion modifications tested and the results obtained with each are indicated in the following table:

TABLE VI.—SELECTIVE HYDROCRACKING OF ARABIAN $C_5$-$C_6$ NAPHTHA

| | Feed | Ion Modification of Zeolite | | | | |
|---|---|---|---|---|---|---|
| | | Zn | Ca | Mg | Mn | Ni |
| Palladium content, wt. percent | | | | 0.5 | | 0 |
| $C_4$- Product, wt. percent | 1.8 | 47.2 | 4.6 | 5.1 | 5.8 | 5.6 |
| Disappearance of $nC_5$+$nC_6$, wt. percent | | 35.9 | 0 | 1.3 | 0.7 | 4.8 |
| $nC_5$ in Total Product, wt. percent | 24.2 | 8.4 | 23.9 | 22.8 | 24.2 | 19.8 |
| $nC_6$ in Total Product, wt. percent | 22.9 | 2.8 | 24.0 | 23.0 | 22.2 | 22.5 |

It is observed from the above table, that the sulfur activated zinc catalyst produced outstanding reduction of normal $C_5$ and $C_6$ paraffins by converting them to $C_4$-gas (predominantly propane and butane), and that conversion over and above this normal paraffin conversion is not excessive. The striking superiority of the zinc form of the catalyst over the other cation modifications is clearly demonstrated.

EXAMPLE 6

As previously indicated, sulfactivation of the catalyst of the invention is to be preferred. The desirability of sulfur activation was demonstrated in an experiment with the Arabian $C_5$-$C_6$ naphtha feed employed in Example 5 with 0.5% added carbon disulfide. The zinc zeolite catalysts of the previous examples, with and without sulfur activation, were employed. The following data includes a comparison of the calcium, magnesium, and nickel modifications without sulfur promoter or activation. The test conditions included: Temperature 850° F.; pressure 500 p.s.i.g.; exit hydrogen rate 2000–3000 c.f./b.; and feed rate 0.5 v./v./hr.

TABLE VII.—SELECTIVE HYDROCRACKING OF ARABIAN $C_5$-$C_6$ NAPHTHA

| | Feed | Ion Modification of 5 A. Zeolite | | | | |
|---|---|---|---|---|---|---|
| | | Zn | Zn | Ca | Mg | Ni |
| Wt. Percent Palladium | | | | 0.5 | | 0 |
| Sulfur Activation | | [1] | [1] | None | None | None | None |
| Wt. Percent $C_4$- Product | 1.8 | 47.2 | 12.9 | 3.8 | 5.6 | 9.9 |
| Wt. Percent $nC_5$+$nC_6$ Disappearance | | 35.9 | 12.5 | 4.0 | 6.6 | 8.9 |
| Wt. Percent $nC_5$ in Total Product | 24.2 | 8.4 | 20.5 | 21.1 | 20.4 | 17.7 |
| Wt. Percent $nC_6$ in Total Product | 22.9 | 2.8 | 14.1 | 22.0 | 20.1 | 20.5 |

[1] 850° F. with 0.5% $CS_2$ in feed.

As indicated without sulfur activation, the zinc modification is superior to the other cation forms as evidenced by the lower amount of normal $C_5$ and normal $C_6$ hydrocarbons and the conversion of these materials to $C_4$-gases. With sulfur activation, the zinc modification exhibits greatly enhanced activity. In a further test the calcium, magnesium and nickel modifications of Example 5 were exhibited to be relatively unresponsive to sulfur activation so as to further distinguish them from the zinc form. Thus, little or no enhancement of activity was obtained by sulfactivation of the Ca, Mg, or Ni forms of the 5 A. zeolite.

EXAMPLE 7

The improved performance of zinc 5 A. zeolite containing 0.5% palladium was demonstrated with a light naphtha feed remaining after extraction of aromatics from a hydroformed product stream. This particular fraction is known as "Benzene Raffinate" which distills in the range of 150–226° F. and contains a negligible amount of sulfur for catalyst activation, the analytical value being 6 p.p.m. When passed over a catalyst of the invention containing 0.5% palladium the normal paraffin content of the feed was only partially reduced. However, when the catalyst was first contacted with the $C_5$-$C_6$ feed of Example 4 containing 1% added carbon disulfide, and then used with the "Benzene Raffinate" feed, a substantial improvement in removal of the normal $C_6$ hydrocarbons resulted. Improved catalyst performance was also reflected in the improved octane number of the $C_{5+}$ product. The operation was at 850° F., 100 p.s.i.g., 0.5 v./v./hr., and 2000–3000 c.f./b. exit hydrogen rate, with the following results:

TABLE VIII.—SELECTIVE HYDROCRACKING OF "BENZENE RAFFINATE"

| Activation Procedure | Feed | None | 850° F. with $C_5$–$C_6$ Naphtha $+CS_2$ |
|---|---|---|---|
| Wt. percent $C_4$- Product | | 16.2 | 32.9 |
| Wt. percent $nC_5+nC_6$ Disappearance | 0 | 6.5 | 15.1 |
| Wt. percent $nC_5$ in Total Product | 1.7 | 1.5 | 1.2 |
| Wt. percent $nC_6$ in Total Product | 15.7 | 9.4 | 1.1 |
| Octane Data on $C_{5+}$ Fraction: | | | |
| Research Clear | 62.3 | 68.2 | 70.4 |
| Research+3 cc. TEL | 87.3 | 85.7 | 91.7 |
| Motor Clear | 64.4 | 70.1 | 79.3 |
| Motor+3 cc. TEL | 88.9 | | 91.4 |

EXAMPLE 8

This example illustrates the increasing activation of catalysts of the invention by continued use with a sulfur-containing feed. It also illustrates catalyst performance using nickel as the metallic hydrogenation component instead of palladium. This catalyst was prepared by exchanging the sodium 5 A. zeolite three times with zinc chloride as in Example 1. The product was washed by slurrying once with water employing 2500 cc. of water for each 500 grams of sodium zeolite originally employed. The washed product was dried at 250–300° F. A charge of 500 grams of this washed product was suspended in 800 cc. of water, and a solution of 125 grams of hydrated nickel nitrate $(Ni(NO_3)_2 \cdot 6H_2O)$ in 200 cc. of water was added at ambient temperature with good agitation. The contacting was continued for 20 hours, whereupon the mother liquor was removed by filtration and the filter cake was dried at 250–300° F. The dried catalyst contained 2% nickel by analysis. The catalyst was calcined at 1000° F. for 3½ hours in a dry atmosphere following a gradual heating pattern of 100° F./hr. in the temperature interval of 300–1000° F. The dried and calcined catalyst was used with the Arabian $C_5$–$C_6$ naphtha employed in Example 4 to which was added 0.5 wt. percent carbon disulfide. The selective hydrocracking conditions included 850° F., 500 p.s.i.g., 0.5 v./v./hr., and a hydrogen gas rate of 2000–300 c.f./b. The low amount of added sulfur was not sufficient to achieve maximum activity in the initial stages but enhanced performance with continued use was demonstrated. In the following table the data obtained are compared to those obtained with the palladium-

TABLE IX.—SELECTIVE HYDROCRACKING OF ARABIAN $C_5$–$C_6$ NAPHTHA

| | Feed | Nickel-Zinc 5 A. Zeolite | | | | | Palladium Zinc 5 A. Zeolite |
|---|---|---|---|---|---|---|---|
| Catalyst Age, Hrs | | 5.5 | 12 | 17 | 24.5 | 32 | *27 |
| Wt. Percent $CS_2$ in $C_5$–$C_6$ Feed | | | | 0.5 | | | 0 |
| Wt. Percent $C_4$- Product | 1.8 | 22.9 | 35.9 | 43.2 | 48.5 | 56.9 | 47.2 |
| Wt. Percent $nC_5+nC_6$ Disappearance | | 17.7 | 25.0 | 30.0 | 34.2 | 37.7 | 35.9 |
| Wt. Percent $nC_5$ in Total Product | 24.2 | 15.8 | 13.7 | 11.5 | 8.4 | 6.4 | 8.4 |
| Wt. Percent $nC_6$ in Total Product | 22.9 | 13.6 | 8.4 | 5.6 | 4.5 | 3.0 | 2.8 |

*Includes 12.7 hours with feed containing 0.5 wt. percent $CS_2$.

zinc catalyst of Example 6, which was activated over 12.7 hours with 0.5 wt. percent $CS_2$ in the feed.

The increase in activity of the nickel catalyst with sulfur dosage is apparent. It is also apparent that the activities of the nickel catalyst and the palladium catalyst are approximately equivalent at the same number of hours on feed (24.5 to 27) when contacted with about the same amount of carbon disulfide (24.5 hours with 0.25% vs. 12.7 hours with 0.5%). The role of sulfur activation of the zinc zeolites is thus clearly established.

EXAMPLE 9

The foregoing examples have demonstrated selective hydrocracking of normal paraffins without conversion of branched paraffins and other high octane components. As hereinbefore indicated this selectivity is a unique feature of the zinc form 5 A. zeolite catalysts of the invention. This example further illustrates this selectivity and compares it to the non-selective behavior of other zeolitic hydrocracking catalysts which have been widely recognized as having excellent hydrocracking activity. The feed utilized was the dearomatized Arabian naphtha feed of Example 4. The other zeolites tested included a palladium faujasite catalyst prepared for the commercial hydrocracking of gas oils and an experimental palladium synthetic large pore size mordenite catalyst. These results are shown below.

TABLE X.—SELECTIVE HYDROCRACKING OF ARABIAN $C_5$–$C_6$ NAPHTHA

| | Feed | Pd-Zn-Zeolite (5 A.) | Pd Faujasite | Pd Mordenite | |
|---|---|---|---|---|---|
| Wt. Percent Pd | | 0.89 | 0.5 | 0.5 | 0.5 |
| Temperature, ° F | | 850 | 750 | 750 | 550 |
| Pressure, p.s.i.g | | 500 | 1,000 | 1,000 | 1,000 |
| Feed Rate, v./v./hr | | 0.5 | 1 | 1 | 1 |
| Wt. Percent $C_4$- | | 30.9 | 86.8 | 99.9 | 24.2 |
| Wt. Percent $iC_5$ | 1.9 | 1.4 | 6.7 | | 9.4 |
| Wt. Percent $nC_5$ | 11.0 | 5.5 | 4.9 | 0.1 | 8.3 |
| Wt. Percent Branched $C_6$ and cyclics | 55.0 | 58.2 | 1.2 | | 41.0 |
| Wt. Percent $nC_6$ | 32.0 | *4.0 | 0.4 | | 17.1 |

*5.77% in $C_{5+}$ which is 69.1% of total.

As observed, the selectivity of the Pd-Zinc 5 A. Zeolite was not exhibited with the other two catalysts. Thus, while the Pd-zinc 5 A. zeolite converted most of the normal paraffins to $C_4$- without affecting the valuable branched $C_6$ and cyclics, the palladium-faujasite was non-selective and converted almost all of the branched $C_6$ compounds and cyclics as well as the normals. Similarly, the palladium mordenite, under conditions which gave less over-all conversion than the palladium Zeolite-A (24.2% $C_4$ vs. 30.9% $C_4$), consumed a substantial portion of the branched $C_6$ compounds and cyclics while removing less than half of the normal $C_6$. Under more severe conditions (temperature of 750° F.) the palladium mordenite converted essentially all of the feedstock to $C_4$-gas. The preferential hydrocracking ability of the catalysts of the invention is thus demonstrated.

EXAMPLE 10

The uniqueness of the palladium-zinc 5 A. zeolite, as compared to other cationic forms, has been demonstrated in the previous examples. As this example illustrates, zinc need not be the sole exchanging cation. Catalysts of appreciable activity were prepared wherein a portion of the zinc was replaced with either calcium or magnesium. In one instance, 570 grams of a zinc zeolite prepared as in Example 1 were suspended in 1500 grams of water and a solution of 500 grams of anhydrous calcium chloride in 1000 grams of water was added with continued agitation for 4 hours at 150° F. The treating solution was removed by filtration and the filter cake was given two additional treatments at 150° F. with calcium chloride as described above. The final filter cake was washed three times each by reslurrying for one hour with 2000 cc. of water and filtering. The washed product was dried and a 450 gram portion was suspended in 1000 grams of water to which was added 170 cc. of an ammoniacal palladous chloride solution containing 13.2 milligrams of palladium per cc. The surplus treating liquid was removed and the catalyst was dried overnight at 250–300° F. The resultant catalyst analyzed as follows:

| Component: | Weight percent |
|---|---|
| Sodium | 0.11 |
| Calcium | 7.5 |
| Zinc | 11.3 |
| $SiO_2$ | 39.6 |
| $Al_2O_3$ | 32.9 |
| Palladium | 0.3 |

The catalyst so prepared was employed in a selective hydrocracking operation first with a light naphtha feed containing sulfur, and then with a light naphtha feed without added sulfur. Comparison of the mixed zinc-calcium zeolite with the zinc zeolite used in Example 5 indicated that the mixed zeolite possessed appreciable activity. The tests were conducted at 850° F., 500 p.s.i.g., 0.5 v./v./hr. and 2000–3000 c.f./b. exit hydrogen rate, with the following results:

TABLE XI

| | Feed | Catalyst | |
|---|---|---|---|
| | | Mixed Calcium-Zinc 5 A. Zeolite | 5 A. Zinc-Zeolite |
| Wt. Percent Palladium | | 0.3 | 0.5 |
| Wt. Percent $C_4^-$ Product | 1.8 | 29.0 | 47.2 |
| Wt. Percent $nC_5 + nC_6$ Disappearance | | 20.6 | 35.9 |
| Wt. Percent $nC_5$ in Total Product | 24.2 | 17.2 | 8.4 |
| Wt. Percent $nC_6$ in Total Product | 22.9 | 9.3 | 2.8 |

It will be observed, therefore, that zeolite catalysts of the invention having a portion of their cation content supplied by zinc are effective selective hydrocracking catalysts, although somewhat less active than those catalysts which have been exchanged solely with zinc cation.

EXAMPLE 11

To demonstrate the effectiveness and utility of other crystalline zeolites having effective pore diameters of about 5 A. in the process of the invention, a catalyst was prepared from the natural mineral erionite and used for the selective hydrocracking of Arabian $C_5$–$C_6$ naphtha. Erionite is a naturally occurring zeolite having elliptical pore openings of 4.7 to 5.2 A. on the major axis.

A 316 gram sample of erionite (from a deposit in Pine Valley, Nevada) was suspended in 2000 grams of water. A solution of one pound of zinc chloride in 500 grams water was added thereto at room temperature, and the mixture was agitated for four hours. The product was removed by filtration and washed by suspension in 2000 grams of water with agitation for one hour. After filtration, the above procedure was repeated twice, so that the total number of exchanges was three. The final zinc-containing product was dried overnight at 250–300° F., and weighed 286 grams.

To incorporate palladium into the zinc-erionite product, the 286 grams of product were suspended in 600 grams of water, and, with agitation, 50 cc. of palladous ammonium chloride containing 37.5 mg. Pd/cc. was added thereto. Agitation was continued for one hour at room temperature. After filtering, washing and drying, the catalyst analyzed 0.6 wt. percent palladium, 7.7 wt. zinc and had a $SiO_2/Al_2O_3$ ratio of 7.3/1. It was then pelletized for use in a fixed bed test unit using Arabian $C_5$–$C_6$ naphtha, with and without sulfur activation (by added $CS_2$ in the feed). The results of the selective hydrocracking tests are summarized below at three different temperature levels.

TABLE XII.—SELECTIVE HYDROCRACKING OF ARABIAN $C_5$–$C_6$ NAPHTHA WITH PALLADIUM-ZINC ERIONITE

[500 p.s.i.g.; 2,000 c.f./b. exit $H_2$ rate; 0.5 v./v./hr.]

| | Feed | | | | |
|---|---|---|---|---|---|
| Temperature, °F | | 700 | 700 | 750 | 800 |
| Hours | | 5 | 7 | 7 | 7 |
| Wt. Percent $CS_2$ in Feed | | 0 | [1] 0.25 | [1] 0.25 | [1] 0.25 |
| Distribution Wt. Percent: | | | | | |
| $C_4^-$-Prod | 1.8 | 10.9 | 37.2 | 56.7 | 63.8 |
| $iC_5$ | 14.1 | 14.0 | 13.5 | 12.4 | 10.3 |
| $n$-$C_5$ | 24.2 | 17.8 | 13.2 | 4.7 | 1.9 |
| $n$-$C_6$ | 22.9 | 18.4 | 4.4 | 0.4 | 0.1 |
| Conv. of $n$-$C_6$ | | 19.7 | 81 | 98.5 | 99 |

[1] After previous activation with same feed containing 1% $CS_2$.

As indicated, the erionite catalyst was highly effective in selectively hydrocracking straight chain hydrocarbons, and was very responsive to sulf-activation. Losses of isopentane were very low. At 750° F. 98.5% removal of normal $C_6$ paraffin was observed, which was somewhat better than that obtained at 850° F. with the synthetic catalyst of the previous examples.

What is claimed is:

1. A process for selectively hydrocracking straight chain hydrocarbons contained in a hydrocarbon feedstock which comprises contacting said feedstock at hydrocracking conditions in the presence of hydrogen with a catalyst comprising a zinc-containing crystalline alumino-silicate zeolite having uniform pore openings of about 5 Angstrom units and a hydrogenation component containing a Group VIII metal.

2. The process of claim 1, wherein said feedstock is a naphtha fraction.

3. The process of claim 1, wherein said Group VIII metal is a platinum group metal.

4. The process of claim 3, wherein said platinum group metal is palladium.

5. The process of claim 1, wherein said Group VIII metal is nickel.

6. The process of claim 1, wherein at least 25% of the cation content of said zeolite is supplied by zinc cation.

7. The process of claim 1, wherein a major proportion of the cation content of said zeolite is supplied by zinc cation.

8. The process of claim 1 which additionally comprises contacting said catalyst with a sulfur-containing compound.

9. The process of claim 1, wherein said feedstock contains sulfur.

10. The process of claim 1, wherein said feedstock is essentially sulfur-free and wherein a sulfur compound capable of being converted to hydrogen sulfide at said hydrocracking conditions is added to said feedstock, whereby said catalyst becomes sulfactivated by contact with said feedstock.

11. The process of claim 1 which additionally comprises activating said catalyst with hydrogen sulfide.

12. A process for improving the octane rating of naphtha fractions by selectively hydrocracking straight chain hydrocarbons contained in said naphtha fractions which comprises contacting said naptha fractions at hydrocracking conditions in the presence of hydrogen with a catalyst comprising a Group VIII metal combined with a zinc-containing crystalline alumino-silicate zeolite having uniform pore openings of about 5 Angstrom units, and recovering a naphtha product of improved octane rating.

13. The process of claim 12 wherein said Group VIII metal is palladium.

14. The process of claim 12 which additionally comprises contacting said catalyst with a sulfur-containing compound.

15. A catalyst composition comprising a hydrogenation component containing a Group VIII metal and combined with a zinc-containing crystalline alumino-silicate zeolite having uniform pore openings of about 5 Angstrom units.

16. The composition of claim 15, wherein said Group VIII metal is palladium.

17. The process of claim 3 wherein said platinum group metal is present in an amount ranging from about 0.1 to 6 wt. percent of said zeolite.

18. The process of claim 8 wherein said contacting is sufficient to incorporate 0.5 to 15 wt. percent sulfur into said catalyst.

19. The process of claim 14 wherein said contacting is sufficient to incorporate 0.5 to 15 wt. percent sulfur into said catalyst.

20. The process of claim 1 wherein said feedstock is naphtha-containing and boils within the range of about 250 to 450° F.

21. The process of claim 1 wherein said hydrocracking conditions include a temperature of 400 to 950° F., a pressure of 200 to 4000 p.s.i.g., a space velocity of 0.2 to 20 v./v./hour, and a hydrogen rate of 1000 to 10,000 standard cubic feet of hydrogen per barrel of feed.

22. The process of claim 1 wherein said hydrocracking conditions include a temperature of 650 to 850° F., a pressure of 500 to 2500 p.s.i.g., a space velocity of 0.4 to 2 v./v./hour, and a hydrogen rate of 1500 to 5000 standard cubic feet of hydrogen per barrel of feed.

23. The process of claim 12 wherein said hydrocracking conditions include a temperature of 400 to 950° F., a pressure of 200 to 4000 p.s.i.g., a space velocity of 0.2 to 20 v./v./hour, and a hydrogen rate of 1000 to 10,000 standard cubic feet of hydrogen per barrel of feed.

24. The composition of claim 15 wherein said Group VIII metal hydrogenation component is present in an amount within the range of about 0.1 to 6 wt. percent based on said zeolite.

25. The composition of claim 15 wherein said Group VIII metal is a platinum group metal.

26. The composition of claim 15 wherein at least 25% of the cation content of said zeolite is supplied by zinc cations.

27. The composition of claim 15 which additionally contains about 0.5 to 15 wt. percent sulfur.

28. The composition of claim 15, wherein said Group VIII metal is nickel.

29. The composition of claim 15, wherein a major proportion of the cation content of said zeolite is supplied by zinc cation.

30. The process of claim 1, wherein said zeolite is erionite.

31. The process of claim 4, wherein said zeolite is erionite.

32. The process of claim 18, wherein said zeolite is erionite.

33. The process of claim 13, wherein said zeolite is erionite and wherein said catalyst is sulfactivated by contact with a sulfur-containing compound.

34. The composition of claim 15, wherein said zeolite is erionite.

35. The composition of claim 27, wherein said zeolite is erionite.

References Cited
UNITED STATES PATENTS

| | | | |
|---|---|---|---|
| 3,039,953 | 6/1962 | Eng | 208—26 |
| 3,236,762 | 2/1966 | Rabo et al. | 208—111 |
| 3,240,697 | 3/1966 | Miale et al. | 208—120 |

DELBERT E. GANTZ, *Primary Examiner.*

A. RIMENS, *Examiner.*